United States Patent

[11] 3,630,377

| [72] | Inventor | Frederick J. Brooks<br>San Rafael, Calif. |
|---|---|---|
| [21] | Appl. No. | 832,052 |
| [22] | Filed | June 11, 1969 |
| [45] | Patented | Dec. 28, 1971 |
| [73] | Assignee | Astrotronic Research, Ltd.<br>North Vancouver, B. C., Canada |

[54] SEWAGE FILTER UNIT
5 Claims, 5 Drawing Figs.

[52] U.S. Cl. .................................... 210/152,
210/19, 210/262, 210/266
[51] Int. Cl. .................................... B01d 23/10,
B01d 29/28
[50] Field of Search............................ 21/54.1,
102.1; 210/19, 20, 152, 261, 262, 266, 317

[56] References Cited
UNITED STATES PATENTS

| 436,171 | 9/1890 | Detwiler...................... | 210/317 X |
| 1,166,802 | 1/1916 | Albert et al.................... | 210/317 X |
| 3,305,481 | 2/1967 | Peterson........................ | 210/19 |
| 3,327,855 | 6/1967 | Watson et al................. | 210/152 X |
| 3,480,542 | 11/1969 | Bucksteeg et al............. | 210/20 |
| 3,489,679 | 1/1970 | Davidson et al.............. | 210/19 |

FOREIGN PATENTS

| 903,800 | 8/1962 | Great Britain................ | 210/19 |

*Primary Examiner*—Samih N. Zaharna
*Attorney*—Julian Caplan

ABSTRACT: Sewage is delivered into a sump under sufficient pressure to counterbalance the hydrostatic pressure of a superimposed vertical series of filters. Water rises through the series of filters while the solids remain in the sump or are removed in the filters. An ultrasonic device destroys bacteria. The outflow of liquid is free of solid contamination and bacteria. Solid components from the sump are burned.

PATENTED DEC 28 1971

INVENTOR.
FREDERICK J. BROOKS
BY Julian Caplan
ATTORNEY

SEWAGE FILTER UNIT

This invention relates to a new and improved sewage filter unit. More particularly the invention relates to a unit for handling sewage either from a sewage system serving a small community or a system for individual residential or commercial units.

A distinguishing feature of the present invention is the fact that no tanks or ponds of the type required for bacterial treatment of sewage are required. Further, objectionable odors and effluent which are characteristic of conventional sewage treatment facilities are not required. Further, objectionable odors and effluent which are characteristic of conventional sewage treatment facilities are not present. In the present invention, materials producing such results are removed. The fact that the unit which is the subject of this invention is compact and free from objectionable odors and discharge makes it possible to locate the unit adjacent residential and commercial property.

Another advantage of the present invention is the fact that relatively large volumes of sewage may be handled, the original equipment cost is low for the volume handled, and furthermore, the operating and maintenance costs are likewise low.

A feature of the invention is the use of successive filter units through which the sewage passes. Thus the sewage first passes through a bed of aggregate which serves as a screen and also reduces turbulence of flow. The liquid then flows upward through a series of filter units which contain screens, the screens preferably being self-cleaning. After the solid material has been screened from the water, the water is preferably subjected to ultrasonic treatment to destroy bacteria. The water may be further treated with ultraviolet rays and ozone.

A principal advantage of the present invention is that the water which is discharged after filtering and further treatment as has been described is reusable. Thus the water may be used for agricultural or industrial purposes. By further treatment, the water may even be made potable. The bacteria and other contaminating material are removed and the water may be aerated to produce water close to natural state, meeting B.O.D. requirements.

Solid material originally in the sewage settles out or is screened out and this material may be burned in a gas or electric burner. If the combustion is efficient, no objectionable fumes are discharged from the burner.

Accordingly, the present invention provides a filter system which produces water which is pure enough for reuse or for discharge into streams, the filtrate being burned to a fine ash.

A feature of the invention is the fact that a column of filters extends end-to-end above the sump. The pressure of the sewage forced into the sump only slightly overbalances the hydrostatic pressure of the filter column. Thus the water in the filter column is either static or moves slowly. The solid components thus tend to settle out under the effects of gravity to the bottom of the sump. Some solids rise with the water but are removed by the filter column. Other objects of the present invention will become apparent upon reading the following specification and referring to the accompanying drawings in which similar characters of reference represent corresponding parts in each of the several views.

Figure 1:
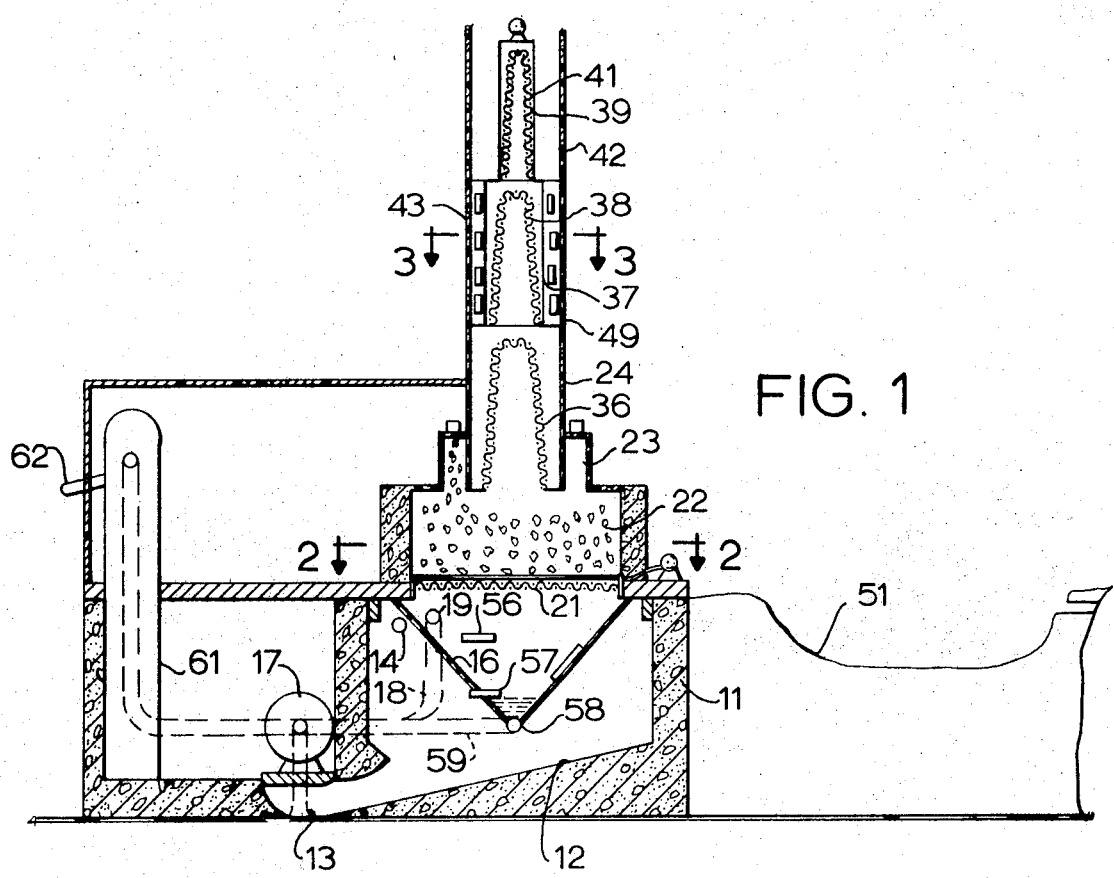
FIG. 1 is a schematic vertical sectional view of one form of the invention.
Figure 2:
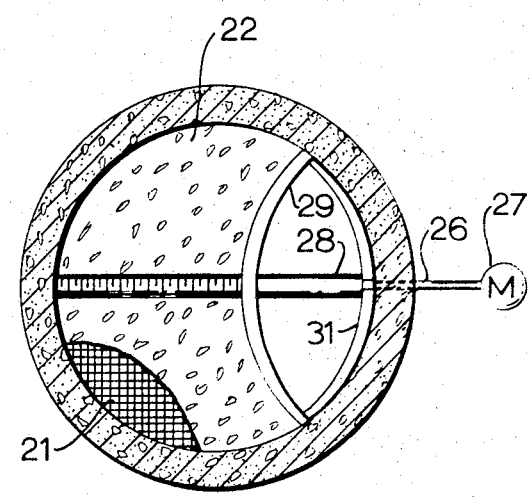
FIG. 2 is an enlarged sectional view taken substantially along 2—2 of FIG. 1.
Figure 4:
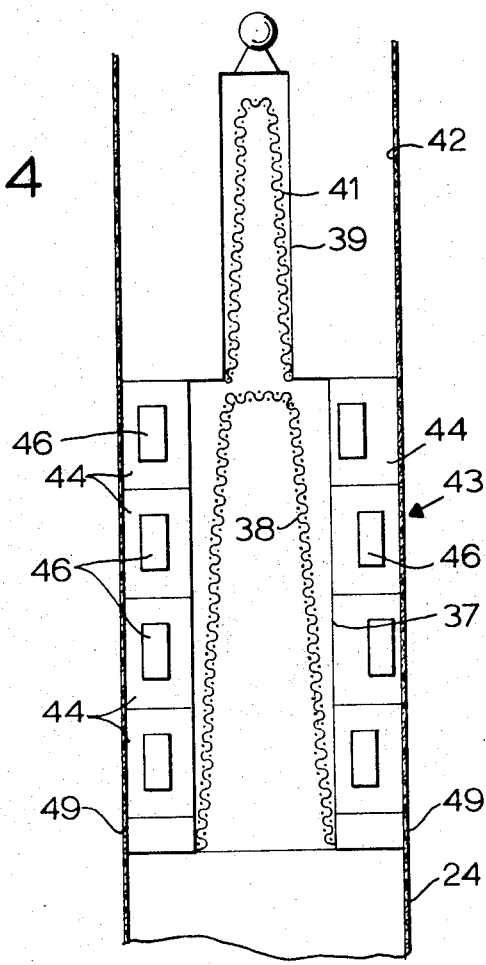
FIG. 4 is a vertical sectional view along line 4—4 of FIG. 3.
Figure 3:
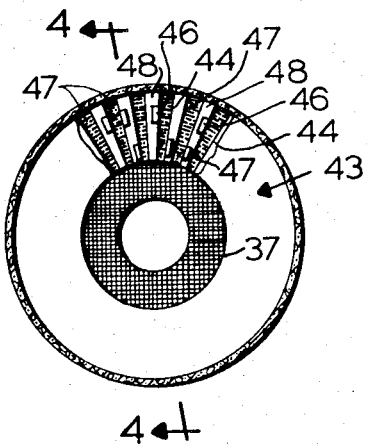
FIG. 3 is an enlarged sectional view taken substantially along line 3—3 of FIG. 1.
Figure 5:
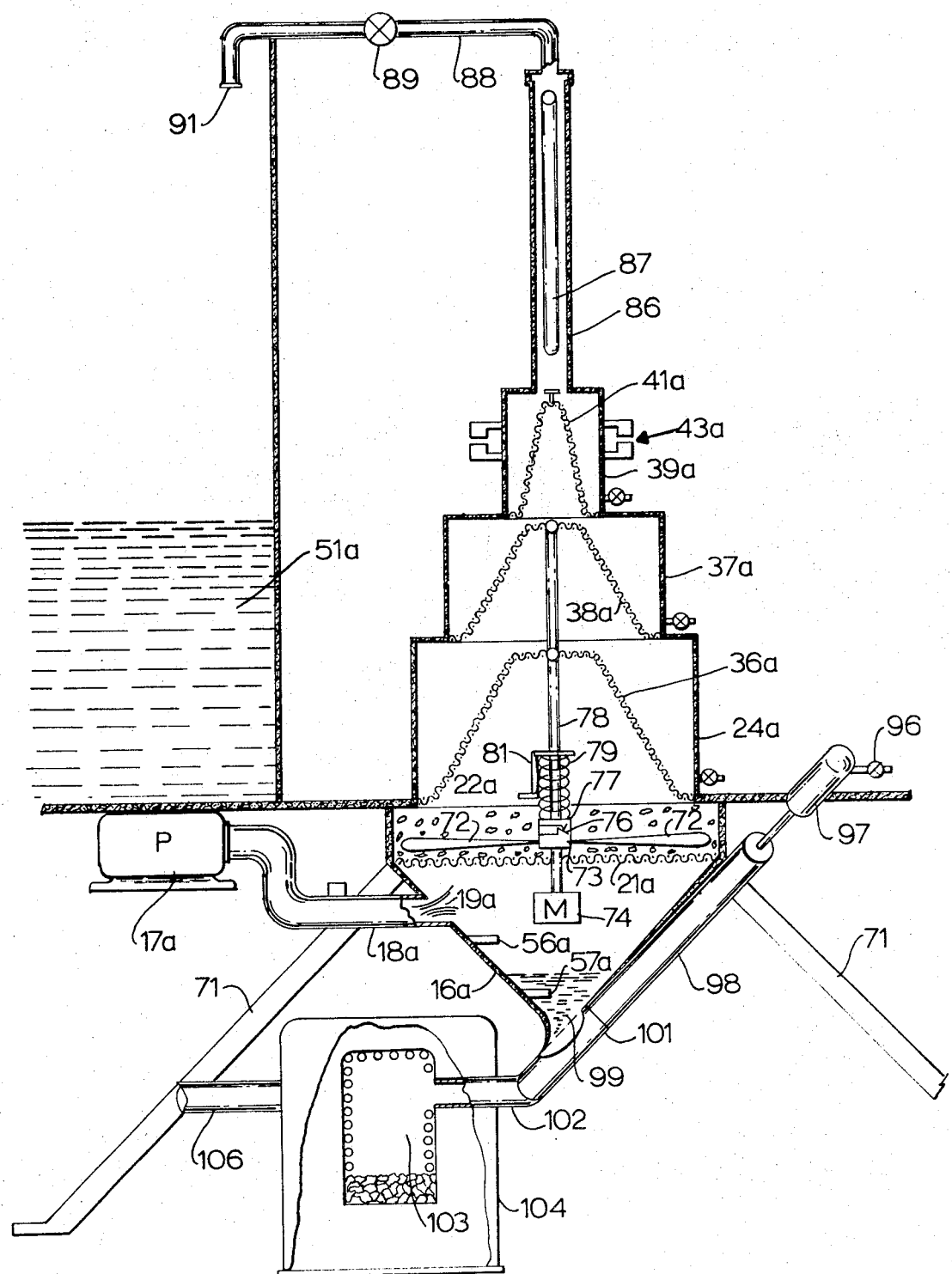

FIG. 5 is a view similar to FIG. 1 of a modification. Located preferably below ground level is a concrete lined pit 11 having a sloping floor 12 leading to a pump inlet chamber 13. Sewage is discharged from its source through a conduit opening 14 within pit 11. Suspended from the top of pit 11 is a conical hopper 16. Sewage is periodically pumped from chamber 13 by means of pump 17 and conduit 18 to hopper inlet 19 located adjacent the top of the hopper. Solid material in the sewage tends to settle to the top of the hopper. The liquid and lighter solids tend to rise to the top and to flow upwardly to the sewage filter system which is superimposed above pit 11 and is hereinafter explained in detail. The pressure at the entrance 19 as created by pump 17 is sufficient to balance the height of the water column in the filters as well as the resistance to hydraulic flow.

The top of hopper 16 carries a screen 21 and above screen 21 is a bin 22 containing aggregate, ceramic or carbon particles, sand or other filter material. Such material functions to trap larger solid particles and also to render turbulence of the flow of the liquid so that the subsequent filter steps may be performed more effectively. Around the top of bin 22 is an annular aggregate storage bin 23 which surrounds the lower end of first filter casing 24. Aggregate is loaded into storage bin 23 and settles downwardly to replace aggregate which is lost in bin 22. Extending through bin 22 near the bottom thereof is a horizontal screw 26 turned externally of the bin by motor 27. Internally threaded nut 28 on screw 26 reciprocates along the length of screw 26 internally of bin 22. Nut 28 carries two scraper blades 29, 31, each of which is arcuate and oppositely disposed, having about the same curvature as the interior of bin 22. The blades 29, 31 force the lower layer of aggregate, which is most highly polluted with solid sewage material, down through screen 21 so that it falls into hopper 16, mixing with the heavy solid sewage material.

Filter casing 24 receives liquid passing up through the aggregate in bin 22. Interiorly of casing 24 is a conical screen 36. Various means may be used to shake screen 36 as is well understood in the filter art so that solid material trapped therein is dislodged and falls to the bottom rather than clogging the screen. Water thus passes through the screen 36 and enters the top and outside of filter chamber 24.

Above filter chamber 24 is a second filter chamber 37 having therein a second conical filter screen 38. Screen 38 further removes solid material and hence preferably is of finer mesh than screen 36. Above chamber 37 is a third filter chamber 39 containing still another conical screen 41. The liquid discharged through screen 41 is substantially free of solid material. Such water overflows the top of casing 39 and enters an annular feed tank 42 which surrounds chamber 39. Tank 42 serves as a feed tank for the ultrasonic tank 43 which is below it, surrounding filter chamber 37.

Ultrasonic tank 43 is intended to destroy bacteria which passed previous filtration. The tank is annular and is separated by a plurality of radial baffles 44. To simplify vibration of baffles 44, a plurality of baffles 44 (here shown as four in number) are superimposed on each other end to end. Each baffle 44 carries an ultrasonic vibrator 46 of a type well known in industry which causes the baffle 44 to vibrate at about 250,000 vibrations per minute or such other frequency as effectively destroys bacteria in the water. The vibrators 46 are staggered relative to the surfaces of baffles 44 so as to provide open vertical passageways 47 for flow of fluid with closed-off areas 48 between passageways 47 in which the vibrators 46 and electrical wiring and auxiliary equipment are installed. The dimensions of passageways 47 are such that there is a flow of approximately 5 gallons of liquid per minute and such flow is subjected to the required frequency. At the bottom of ultrasonic tank 43 is a discharge opening 49 from which the water flows down over the outsides of tank 24 and bin 22 into a pool 51. It will be understood that other tank arrangements may be employed to receive and store the water for reuse.

Located in hopper 16 are upper and lower level sensors 56, 57 which sense the level of solid matter within said hopper. When the level rises above the sensor 56, valve 58 at the bottom of hopper 16 opens permitting discharge of solid matter through conduit 59 into burner 61. A screw (not shown) or other convenient means may be installed in conduit 59 to transport the solid material from the valve 58 to the burner. When sufficient burner material has been discharged from hopper 16 so that the level of material inside the hopper is below sensor 57, valve 58 is closed. Gas or electric heat in burner 61 incinerates the solid material. Ash is discharged through outlet 62 and sacked or otherwise handled while the fumes escape into the atmosphere. Because of the thoroughness of combustion within the burner 61, the details of which form no part of the present invention, the fumes escaping are not objectionable.

It will thus appear that the water discharged from the filter system is reusable for agricultural and industrial purposes. As is well known in the water treatment art, by use of a second stage evaporator burner it may even be used as drinking water. At the same time the solid material is screened out of the water and all solid matter is collected in the hopper 16. The solid material shaken from the screen 36, 38, 41 may be collected and burned in the burner 11 along with that which is received in hopper 16.

The tank 43 may be energized by ultrasonic means, as has been described. However, UHF waves capable of destroying bacteria, virus, fungus and other unwanted growths in the solution, all of which are well understood in industry, may be substituted or used in addition. The term "high-frequency vibrations" is used herein to include ultrasonic vibrations and UHF waves including microwaves and equivalent waves.

A modified unit is shown in FIG. 5 designated to handle smaller volume of sewage. Many of the elements of this modification are very similar to those of the preceding modification and the same reference numerals followed by the subscript *a* are used to designate corresponding parts.

In the form of the invention shown in FIG. 5, hopper 16a is of conical shape and is supported above the ground by legs 71. Sewage is pumped by its source by pump 17a through conduit 18a to an outlet 19a in hopper 16a. The lighter components and the water are forced by pump 17a upward through the filter column. Such material first passes through a screen 21a near the top of hopper 16a above which is coarse aggregate or the like. In order to agitate the aggregate and to prevent clogging of same, a plurality of rotatable blades revolve at slow speed horizontally in the bottom of the aggregate bed. Blades 72 extend outward from hub 73 which is driven by shaft of motor 74.

From the aggregate bed the liquid rises into the first or lowermost filter chamber 24a which contains a conical filter screen 36a. The screen is fixed to vertical shaft 78. The upper end of hub 73 has a cam 76 and the lower end of shaft 78 carries a complementary cam 77. Spring 79 which surrounds the lower end of shaft 78 is held at its upper end by bracket 81 so that it creates a downward pressure of cam 77 against cam 76. As motor 74 revolves, the cam 73 raises cam 77 and shaft 78 against the force of spring 79. When the low dwell of cam 76 is reached, the shaft 78 under the force of gravity and of spring 79 drops the screen 36a forcibly, shaking off any solid material which may tend to clog the same. The material discharged from the screen falls into the aggregate bed 22a.

Water passing through screen 36a flows upward into second or intermediate chamber 37a which contains a conical screen 38a preferably of smaller size than screen 36a. Screen 38a is also attached to shaft 78 and is shaken in the same manner.

The topmost filter action 39a containing a conical screen 41a receives the liquid passing through screen 38a. Although this screen may also be attached to shaft 78a it is usually unnecessary to shake the same as ultrasonic vibrator 43a helps keep it clean. Ultrasonic vibrator 43a may be associated with the outer walls of the filter section 39a to vibrate the same and to destroy bacteria which may be in the water. Where further processing of the water is desired a column 86 receives the discharge of screen section 39a. Ultraviolet radiating tubes 87 may be installed in column 86 and ozone generating devices and oxygen supply may be associated therewith to further purify the water. The water leaving stack 86 passes through a conduit 88 having a valve 89 installed therein which adjusts the flow commensurate with the discharge of pump 17a so that a proper pressure relationship is established within the filter system. Discharge 91 of conduit 88 discharges the purified water into tank 51a.

The solid material in hopper 16a is periodically burned. Upper and lower level sensors 56a, 57a, electronically control water valve 96 which controls operation of hydraulic ram 97. Ram 97 drives a piston 98 which pushes solid matter in hopper 16a which escapes through an opening 99 in the bottom thereof into the cylinder 101 in which piston 98 reciprocates and through conduit 102 into a cage 103 in burner 104. Electric heating elements or gas flames in burner chamber 104 incinerate the solid material in cage 103 and the gases escape through stack 106.

What is claimed is:

1. A sewage filter system comprising a sump, means for delivering sewage under pressure into said sump, a bed of aggregate above and in fluid communication with said sump, at least one conical screen filter above said bed of aggregate, effluent from said bed discharging into said screen filter, a casing around the outside of said screen filter to receive the discharge from said screen filter, baffle means between said casing and said screen filter confining flow of discharge from said screen filter to a plurality of narrow vertical passageways, a source of ultrasonic vibrations attached to said baffles to destroy bacteria in said discharge from said screen filter and also to vibrate said screen to clear away from said screen filter solid matter tending to clog same, a burner, and means for discharging solids from the bottom of said sump into said burner.

2. A system according to claim 1, which further comprises means for discharging some of the aggregate from said bed into said sump to mix with said solids.

3. A system according to claim 1, which further comprises a second filter above said one filter and a casing around said second filter to define an annular feed tank for said vibrator directly above said source.

4. A system according to claim 1, in which at least one of said filters is a cone and which comprises a vertical shaft fixed to said core and means for shaking said shaft and cone to unclog said filter.

5. A system according to claim 4, which further comprises means for rotating said shaft and means associated with said shaft to move through said bed to unclog said bed.

* * * * *